(12) United States Patent
Matkovich

(10) Patent No.: US 6,415,907 B1
(45) Date of Patent: Jul. 9, 2002

(54) ARTICLE TRANSFER APPARATUS

(75) Inventor: Mario Matkovich, Williamstown (AU)

(73) Assignee: Rosebay Terrace Pty Ltd., Springvale (AU)

( * ) Notice: Subject to any disclaimer, the term of this patent is extended or adjusted under 35 U.S.C. 154(b) by 0 days.

(21) Appl. No.: 09/486,164
(22) PCT Filed: Aug. 21, 1998
(86) PCT No.: PCT/AU98/00666
§ 371 (c)(1),
(2), (4) Date: May 8, 2000
(87) PCT Pub. No.: WO99/10260
PCT Pub. Date: Mar. 4, 1999

(30) Foreign Application Priority Data

Aug. 22, 1997 (AU) .............................................. PO8716

(51) Int. Cl.$^7$ .............................................. B65G 37/00
(52) U.S. Cl. ................................ 198/465.4; 198/486.1; 198/680
(58) Field of Search ........................... 198/465.4, 486.1, 198/680

(56) References Cited

U.S. PATENT DOCUMENTS

| 2,661,103 A | * | 12/1953 | Fay et al. ........................ 214/6 |
| 2,890,556 A | * | 6/1959 | Engleson et al. .............. 53/251 |
| 3,101,868 A | * | 8/1963 | Glaubke ....................... 221/225 |
| 3,160,316 A | * | 12/1964 | Kerr ............................ 221/225 |
| 3,207,286 A | * | 9/1965 | Cozzoli ......................... 198/25 |
| 4,022,338 A | * | 5/1977 | Laursen ........................ 214/89 |
| 4,262,795 A | | 4/1981 | Hecker ......................... 198/479 |
| 4,488,637 A | | 12/1984 | Loeffler ......................... 198/653 |
| 5,400,574 A | | 3/1995 | Spatafora ...................... 53/531 |
| 5,630,311 A | | 5/1997 | Flix ............................. 53/543 |
| 5,667,056 A | * | 9/1997 | Kimmet .................... 198/463.5 |
| 5,806,657 A | * | 9/1998 | Enderlein et al. ........... 198/680 |
| 5,878,867 A | * | 3/1999 | Schneuing ................... 198/680 |
| 6,199,682 B1 | * | 3/2001 | Matkovich ................ 198/465.4 |

FOREIGN PATENT DOCUMENTS

EP        0687504 A1        12/1995

* cited by examiner

Primary Examiner—Joseph E. Valenza
Assistant Examiner—Rashmi Sharma
(74) Attorney, Agent, or Firm—Amster, Rothstein & Ebenstein

(57) ABSTRACT

Apparatus of the tributary garment hangers on to the moving carrier include a conveyor for transporting the garment hangers, a drive for moving the carrier, and a coordinating mechanism cable controlling the relative movements of the conveyor and the drive such that a carrier being moved by the drive and a garment hanger being transported by the conveyor can be separately moved to a contact location in which the carrier will contact the garment hanger although the carrier and garment hanger are moving. The conveyor and the carrier configured such that the garment hanger is caused to be transferred onto the carrier following the carrier's initial contact with the garment hanger. The garment hangers are suspended from a rotatable shaft having an external helical thread to convey the articles.

13 Claims, 1 Drawing Sheet

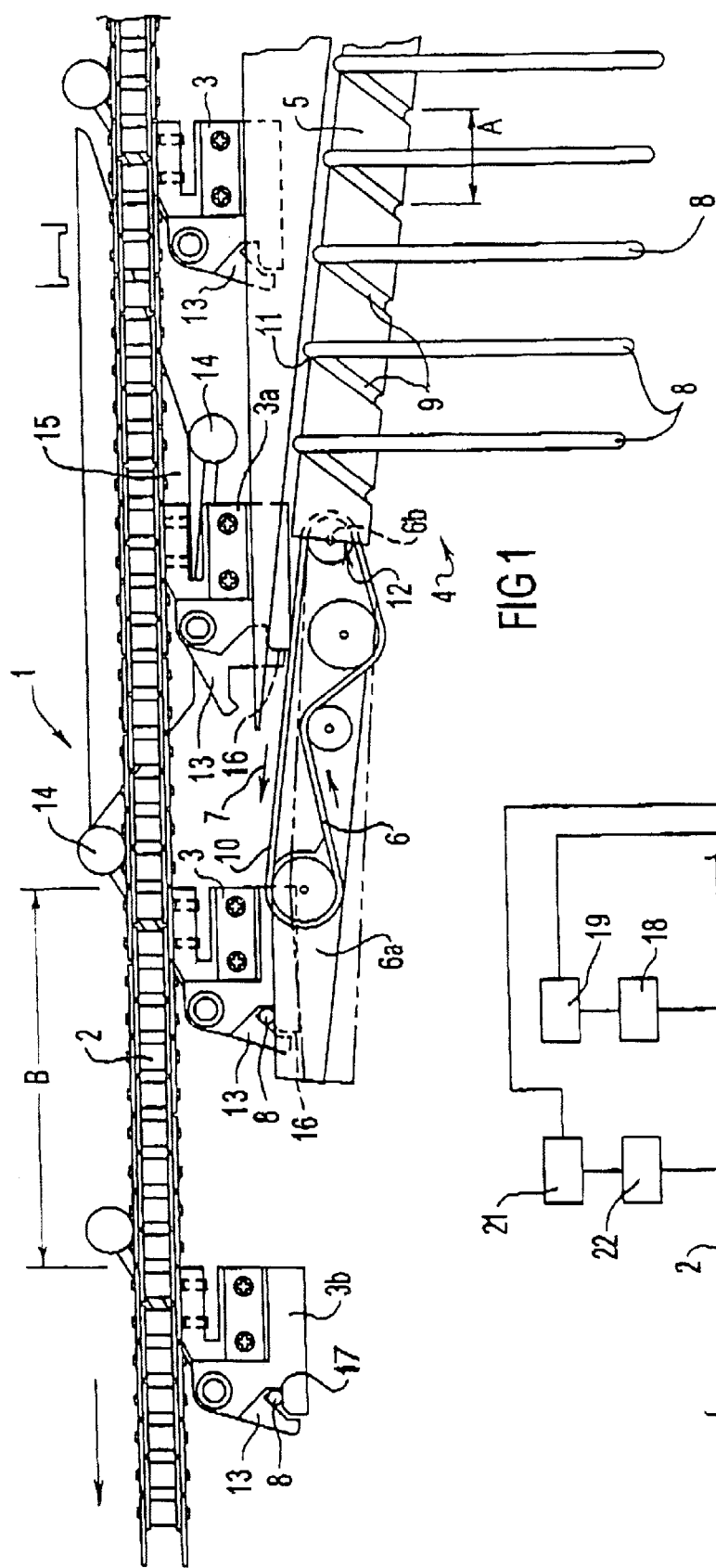
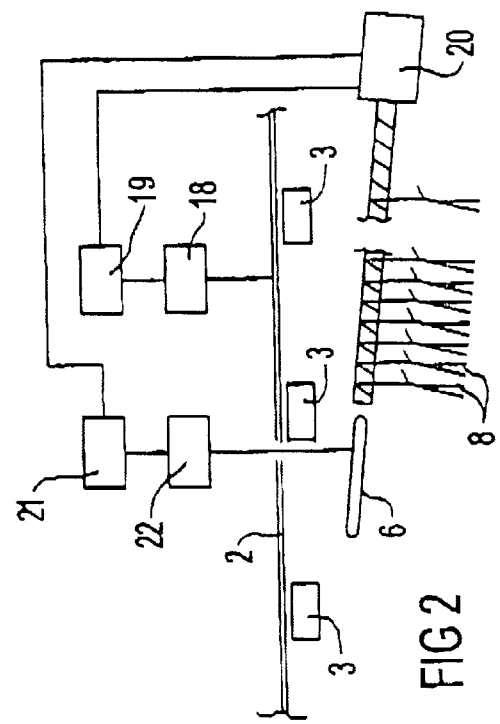
FIG 1
FIG 2

ARTICLE TRANSFER APPARATUS

CROSS-REFERENCE TO RELATED APPLICATION

This application claims the benefit of PCT/A98/00666 filed Aug. 21, 1998 and published in English.

BACKGROUND OF THE INVENTION

This invention relates to an apparatus for transferring one or more articles onto moving carriers.

In apparatus designed for the automated handling of articles, it is often necessary to transfer an article onto a carrier. The article may thereafter be processed whilst being transported on the carrier. Such processing might include labelling, cleaning, delabelling, identification, sorting, packaging or some other similiar operation. The present invention does not concern the manner by which an article might be processed whilst being conveyed by such a carrier, but rather relates to an apparatus for conveniently and quickly transferring articles onto a carrier which might then deliver the articles to another destination for further processing. The invention Is particularly suited for use in a garment hanger sorting apparatus such as the type described in the applicant's copending International Patent Application PCT/AU96/00721 and the contents of this earlier application is incorporated by reference.

It will be appreciated that the Invention hereafter described is suitable for use in transferring a range of different articles onto a carrier utilised in automated article handling apparatus. For convenience, however, much of the subsequent discussion of the invention is made with reference to the loading of a garment hanger onto a carrier. It should be appreciated that the present Invention, whilst having particular applicability in loading garment hangers onto a carrier is not so limited and that the invention is suitable in a range of different applications in which articles are to be handled by automated goods processing equipment.

In any goods processing equipment, the speed at which articles can be transferred or loaded onto a conveyor or carrier can be a limiting factor (and is often the most limiting factor) in determining the rate at which the apparatus can operate. Clearly the rate at which articles are loaded onto a automated processing apparatus sets an upper limit as to the rate at which the apparatus can operate (in terms of number of articles per unit time). For example, in the case of garment hanger sorting apparatus such as that described in the applicant's International Application PCT/AU96/00721 the rate at which garment hangers may be sorted is limited by the speed at which individual garment hangers can be loaded onto the hanger conveyor.

The present invention is more particularly concerned with an apparatus and method whereby an article can be transferred onto a carrier whilst the carrier is moving. If a carrier is required to be stationary for the transfer of articles on to it, this not only slows down operating performance but can also lead to malfunction due to the need for intermittent operation of the apparatus between loading and processing operations. Malfunction is particularly likely if the articles being transferred are suspended from a conveyor and the articles are moved to the carrier and then stopped. This intermittent operation can cause the articles to swing and potentially entangle.

An object of the present invention is to provide an apparatus for loading an article onto a carrier in a rapid manner and under conditions where it is less likely that there will be malfunction.

SUMMARY OF THE INVENTION

Accordingly, in one embodiment of the present invention, there is provided an apparatus for transferring an article onto a moving carrier, said apparatus including:-.

(a) a conveyor for transporting an article;

(b) drive means for moving a carrier; and (c) coordinating means;

wherein said coordinating means is capable of controlling the relative movements of the conveyor and the drive means such that a carrier being moved by the drive means and an article being transported by the conveyor can be separately moved to a contact location at which the carrier will contact the article whilst both the carrier and the article are moving and wherein the conveyor and the carrier are configured such that the article is caused to be transferred onto the carrier upon or following the carrier's initial contact with the article.

Preferably, the coordinating means controls the relative movement of the conveyor and the drive means such that the carrier is moving faster than the article at the contact location. Preferably, the article Is being transported by the conveyor at the contact location at a speed which is between one half to two thirds of the speed at which the carrier is moving at the contact location.

Preferably the article and the carrier are moving in substantially the same direction immediately prior to reaching the contact location. Because the article is being moved at the time of contact, the article is less likely to jolt forward in an uncontrolled manner when the contact occurs than if it were stationary and this assists in efficient transfer of the article onto the conveyor. In the case of garment hangers, there are particular difficulties which arise from sudden and abrupt contact if the garment hanger is stationary. If the garment hanger is suspended from a conveyor it is likely to swing about if there is abrupt contact. Furthermore, in the case of garment hangers comprising a body which is rotatable on a wire hook, abrupt contact can lead to the body rotating and if garment hangers are closely spaced on a conveyor, this can lead to entanglement again causing malfunction.

Preferably, there is not a significant differential between the speed of the carrier and the speed of the article at the contact location. Most preferably, the differential is not more than 0.10 mts. In a preferred embodiment, for the transfer of garment hangers, the carrier travels at a speed between 0.15 m/s and 0.30 m/s at the contact location and the garment hanger Is travelling at a speed of between 0.10 m/s and 0.20 m/s at the contact location.

It is preferred that the apparatus be able to process multiple articles In succession. Accordingly, it is preferred that the conveyor be able to simultaneously transport a plurality of articles and the drive means be capable of moving a plurality of carriers. In this arrangement, the coordinating means should control the relative movements of the conveyor and the drive means so that for each article transported to the contact location, a separate carrier will be moved to reach the contact location at the same time.

The carrier may collect the article so that it is transferred from the conveyor at the time of initial contact and this may be achieved, for example. by the carrier incorporating a hook or ledge onto which the article may be transferred. However, transfer is preferably delayed so that the article may be moved in concert by or with the carrier for a distance prior to transfer. This enables a progressive increase in speed for the article and thus a smoother transfer onto the carrier.

Preferably the carrier includes holding means for engaging at least a portion of the article.

Preferably the holding means is in the form of a recess on the carrier which is configured to accommodate at least a portion of the article. In one embodiment, where the apparatus is used for collecting and conveying garment hangers, the recess includes a flat seat on which the hooked part of the garment hanger can be located. In this arrangement, the seat supports the hanger with the remaining part of the hanger being arranged to suspend from the carrier it is intended that the carrier be shaped and designed so that it is able to carry articles from one location to another.

Preferably each carrier includes an abutment surface which can abut against a portion of the article at the contact location. The abutment surface preferably projects forwardly from the holding means in the direction of the carrier's movement, so that on abutment with the abutment surface, the article moves with the carrier under operation of the drive means prior to being engaged by the holding means.

Preferably, at least part of the conveyor is mounted on a portion which includes a ramp which Is inclined relative to the direction of movement of the carrier. In this arrangement, the conveyor functions to move the article along the ramp to the contact location from where it may be moved at a faster rate by the carrier under operation of the drive means. As the article moves along the ramp it is preferred that it simultaneously be caused to move relative to the abutment surface and the apparatus is arranged such that this relative movement continues until the article is moved from the abutment surface and into a position where it can move into engagement with the holding means.

Preferably, the carrier further includes retaining means operable to retain the article to the holding means. In one form, the retaining means can be positioned in either an operative mode where it operates to retain the article to the holding means or an inoperative mode where it does not retain the article relative to the holding means.

In a preferred form, the retaining means includes a pair of fingers which can be located on opposite sides of the article. The fingers are controllable by an operation arm which is able to move the fingers so to change the retaining means between the operative and inoperative modes.

In one form, the fingers are located at one of opposite ends of the operation arm. A pivot is located intermediate of the arm ends and the mode of the fingers is controlled by movement of the arm. In this way, the retaining means is able to change between the operative and inoperative modes by applying a force to the end of the operation arm opposite to the fingers. In a preferred form, the force can be applied automatically through the use of a cam or the like.

The conveyor may be in any form suitable for transporting articles from a location remote from the contact location to the contact location. It preferably moves the articles at a constant speed when they are proximate to the contact location. The conveyor preferably includes means to transport articles to the contact location at a constant frequency. Preferably articles are transported by the conveyor with articles being equidistantly spaced on the conveyor.

In the situation where the articles being transferred onto the moving carrier are garment hangers or any other articles which might be hung from a hook, it is preferred that the conveyor be or include a rotatable shaft having an external helical thread. The helical thread may be in the nature of a groove or a raised rib located on the surface of the shaft.

Most preferably, the shaft is provided with a helical groove. In this arrangement, garment hangers may be suspended from the shaft by engaging the hooks of the respective garment hangers into the helical groove on the shaft. Preferably, the width of the groove is slightly wider than the width of the hook of the garment hanger being suspended therefrom. Preferably, garment hangers are located along the groove and spaced by the distance of the pitch of the groove. Thus, the garment hangers when suspended from the shaft in this way will be equally spaced and one full rotation of the shaft will advance each hanger, a distance equal to the pitch of the thread. When the shaft is fully loaded In this way, for every full rotation of the shaft one hanger will be delivered to the end of the shaft.

In this arrangement, in order for a carrier to be associated with each hanger (or other similar such article) delivered to the end of the shaft by a complete rotation thereof, It is necessary that respective carriers be conveyed by the drive means to the contact location for every complete rotation of the shaft. Once determining the distance between respective carriers and the speed of rotation of the shaft, the coordinating means can control the movement of the conveyor or the movement of the drive means or both to ensure that a respective carrier is conveyed so to reach the contact location for each full rotation of the shaft. Preferably, the forward movement of the garment hanger or other article by rotation of the shaft is such that it is less than the speed of the carrier.

Preferably, the conveyor also includes an inclined ramp with an associated conveyor belt and the article is transferred onto the carrier at a location adjacent to the moving conveyor belt. Preferably, the conveyor belt moves the article forward at a speed greater than the speed at which It moved on the rotating shaft, but less than the speed at which the carrier is moved by the drive means. Most preferably, the shaft conveys the article at a speed of approximately one third the speed of the carrier, the conveyor belt conveys the garment hanger at a speed which is approximately two thirds of that of the carrier. In this way, the speed at which the article is conveyed to the contact location is progressively increased. This minimises the prospect of malfunction. Preferably, the conveyor belt is inclined at the same inclination as the shaft and the conveyor belt is located such that a hanger or other similar article delivered off the end of the shaft onto the conveyor belt will not experience any substantial upwards or downwards movement. In other words, that part of the conveyor belt located proximate the end of the shaft preferably has its upper most surface at a level approximately equal to the level of the base of the groove in the rotating shaft.

Preferably, the conveyor belt is located on a separate support element which is hinged to allow downward movement should there be any malfunction in the transfer of the article from the conveyor belt onto the carrier. For example, if a garment hanger becomes caught underneath a carrier, continued forward movement of the carrier will cause downward pressure on the conveyor belt and thus on the hinged support element causing downward movement for the ejection of the hanger or other article not correctly transferred onto the carrier.

Preferably, the coordinating means is provided by linked encoders and hardware which is designed to measure and regulate the speed of the conveyor and the speed of the drive means and the respective positions of the carriers and the articles to ensure simultaneous delivery of an article and a carrier to the contact location for smooth transfer onto the carrier. The applicant's preferred arrangement involves the following.

1. Setting the speed of the drive means. Preferably the drive means includes a chain or belt which is driven by an electric motor. The speed of the chain is set by adjusting the electric current delivered to the electric motor.
2. An encoder positioned adjacent to the chain or belt measures the speed and position of the carrier and this information is relayed to a controller for setting the speed at which the shaft is to be rotated.
3. The speed at which the shaft is rotated is communicated to separate apparatus which In turn regulates the speed of a servo motor linked to the conveyor belt drive.

The apparatus for coordinating the respective components speed is known in the art. The coordinating means is preferably set to ensure that the conveyor belt operates so to move the article at a speed greater than the speed at which it is conveyed by the shaft conveyor but slower than that at which the drive means moves the carrier. Positional coordination by the coordinating means is important so to ensure that a respective carrier is delivered to the contact location at the same time as an article is delivered by the conveyor belt to that location so that the article may be transferred onto the carrier whilst both are moving.

In a further embodiment of the present invention, there is provided an apparatus for the continuous processing of articles, said apparatus including:

(a) a drive means which includes a continuous chain or belt. to which there is attached a multiplicity of carriers equally spaced about said chain or belt;

(b) a conveyor for transporting articles to a location at which the articles can be associated with respective ones of the carriers; and (c) coordinating means:

wherein said coordinating means controls the relative movement of the conveyor and the drive means such that carriers being moved by the drive means and articles being transported by the conveyor will in turn be separately delivered to a contact location at which the respective carriers sequentially come into contact with respective articles whilst both the respective carriers and articles are moving and whereby articles are caused to be sequentially transferred onto the respective carriers upon or following each carrier's contact with a respective article.

Preferably, articles are loaded onto the conveyor and spaced such that respective articles can be)transferred sequentially onto each carrier that passes the contact location.

BRIEF DESCRIPTION OF THE DRAWING

A preferred embodiment of the invention is hereinafter described with reference to the following drawings in which:

FIG. 1 is a schematic view of a loading apparatus in accordance with the present invention; and FIG. 2 is a schematic representation of the apparatus illustrating interconnection of various encoders when used as the coordinating means.

DETAILED DESCRIPTION OF THE PREFERRED EMBODIMENTS

In FIG. 1 there is Illustrated an apparatus 1 which includes a chain 2 which is driven by a drive wheel which is not shown. Chain 2 is preferably a continuous chain which is run in a loop. To the chain there is attached respective carriers 3 suitable for holding and transporting articles for further processing. The apparatus further includes a conveyor 4 which includes a conveyor shaft 5 and a conveyor belt 6. Conveyor shaft 5 is disposed at an angle and is inclined upwardly. Shaft 5 is, in normal operation, rotated such that articles retained thereon will move in the direction of the arrow marked 7. A garment hanger 8 is shown located in a portion of the helical thread 9 formed in the outer surface of conveyor shaft 5. The upper most surface 10 of conveyor belt 6 is aligned to be at a height approximately equal to the bottom of the seat 11 in helical thread 9 such that when a garment hanger 8 is conveyed to the end of conveyor shaft 5, it will be smoothly transferred onto the conveyor belt 6 without any substantial upward or downward movement. Furthermore, to minimise any jolting or disruptive movement in transferring between conveyor shaft 5 and conveyor belt 6, the end of conveyor belt 6 is located within the end portion 12 of conveyor shaft 5 which is hollow to accommodate this section of the conveyor belt 6.

In operation, hangers 8 are sequentially loaded onto conveyor shaft 5. As the hooks of the hangers engage with the upper most portion of the conveyor shaft 5 and as only one hanger is located within the helical groove 9 at any one location, the respective hangers are each separated by the pitch of the helical groove 9 which is shown as distance A in FIG. 1. The carriers 3 are separated by distance B and are separated equidistantly around the entire chain loop. As one full rotation of conveyor shaft 5 will deliver one additional garment hanger or article onto conveyor belt 6 for collection by carriers 3, it is necessary for the proper operation of the apparatus that the respective carriers move through a distance equal to B in the same time as it takes conveyor shaft 5 to rotate through one full rotation. Furthermore, the location of the respective carriers 3 must be coordinated with the location of the garment hangers moving onto the conveyor belt 6 so that carrier 3 can pick up the garment hanger before it runs off the end of the conveyor belt 6. Alternatively, if the carrier 3 arrives at the contact location before the garment hanger, there will be malfunction such as by the hanger becoming caught underneath the carrier. In case of such malfunction, it is preferred that the support 6a for conveyor belt 6 be resiliently pivotable about a pivot point (such as 6b) so that the support ea can move downwardly for ejection of unassociated hangers (the downward position is shown in FIG. 1 in dotted outline). The speed of the hanger on the conveyor belt is preferably slightly less than the speed at which the carrier is moving so that there is positive contact and thereafter pickup as the carrier 3 passes the conveyor belt 6. However, the speed differential should not be such that the pickup is abrupt or causes the hanger to jump or move forward in a way which will not permit smooth transfer onto carrier 3.

Preferably, each carrier 3 incorporates a moveable locking mechanism 13 which is activated by an associated lever 14 and a separate cam 15 located adjacent to conveyor belt 6 such that when the carrier is moved towards conveyor belt 6, operating arm 14 is moved downwardly to open the locking mechanism 13 and hold the mechanism open during its travel past conveyor belt 6. A carrier with the locking mechanism in this open position is identified In FIG. 1 as 3a. Once the article has been transferred onto the carrier, the locking mechanism is designed to close as in the carrier shown in FIG. 1 as 3b. The timing of the closure can be determined by the length of cam 15 located adjacent to the drive chain.

It will be appreciated from the foregoing that hangers 8 can be conveyed by the rotation of conveyor shaft 5 at a first speed, transferred onto conveyor belt 6 operating at a second speed, moved forward by the carrier 3 along the conveyor belt 6 after contact at a third speed and thereafter engaged by the locking mechanism 13 to retain hanger 8 on carrier 3, It is preferred that the first speed is slower than the second speed which in turn is slower than the third speed. In this arrangement, the speed at which the carrier is moved can be progressively increased and this enables smoother transition of the hanger onto carrier 3. In the embodiment shown, each of the respective carriers first come into contact with a hanger to be transferred whilst the hanger 8 is moving on conveyor belt 6. As the carrier 3 is moving faster than the hanger 8 whilst it is on the conveyor belt, after contact the carrier moves the hanger along the belt at a faster rate than at which the belt is moving. Carrier 3 includes an abutment face 16 which contacts the hanger. As the hanger is moved upwardly along the incline of conveyor belt 6, it moves to a position above abutment face 16 so that it may be accommodated and moved into seat 17 by locking mechanism 13.

The relative positions of the carriers and hangers are controlled in this preferred embodiment by a series of encoders and controllers as shown in FIG. 2. In operation, chain 2 is set at the desired speed by adjusting the current to an electric motor driving a wheel (not shown) which in turn drives the chain 2. Encoder 18 identifies the rate at which carriers 3 are moving and also their position. This information is relayed to controller 19 which In turn controls servo motor 20 which drives conveyor shaft 5. The controller 19 ensures that the location of hangers 8 relative to carriers 3 and their speed are such that respective hangers and carriers will meet at the contact location adjacent conveyor belt 6. Information from servo motor 20 is in turn relayed to controller 21 which determines the rate at which servo motor 22 drives conveyor belt 6. Through this arrangement, the matching of hangers 8 to carriers 3 for contact and subsequent pickup is coordinated thus permitting rapid transfer of hangers onto carriers.

It will be appreciated that the present invention permits for the transfer of articles such as garment hangers directly onto a moving carrier in a smooth fashion unlikely to give rise to malfunction and in a way which facilitates rapid delivery of articles onto the carrier. Instead of picking up articles which are stationary, the present invention provides for the movement of both carrier and article coming from different directions and different speeds and coordinated so to simultaneously reach a contact location at or following which the article may be smoothly transferred onto a carrier. This enables more rapid transfer onto carriers than similar apparatus which involves pickup from a stationary position and thus allows more rapid processing of articles in any subsequent processing arrangements.

It will be appreciated that various modifications and/or improvements can be made to the apparatus hereinbefore described without departing from the spirit or ambit of the invention as hereinbefore described.

What is claimed is:

1. An apparatus for transferring articles onto a moving carrier, said apparatus including:
   (a) a conveyor for transporting articles;
   (b) drive means for moving a carrier; and
   (c) coordinating means;
   wherein said coordinating means is capable of controlling the relative movements of the conveyor and the drive means such that a carrier being moved by the drive means and an article being transported by the conveyor can be separately moved to a contact location at which the carrier will contact the article whilst both the carrier and the article are moving and wherein the conveyor and the carrier are configured such that the article is caused to be transferred onto the carrier following the carrier's initial contact with the article; and
   wherein the articles being transferred onto the moving carrier are garment hangers which might be hung from a hook, and the conveyor includes a rotatable shaft having an external helical thread, the garment hangers being suspended from the shaft by engaging the hooks of the respective garment hangers into the helical thread on the shaft.

2. An apparatus according to claim 1, wherein the helical thread is a groove located on the surface of the shaft.

3. An apparatus according to claim 2, wherein the shaft is provided with a helical groove.

4. An apparatus according to claim 3, wherein the width of the groove is slightly wider than the width of the hook of the garment hanger being suspended therefrom.

5. An apparatus according to claim 4, wherein garment hangers are located along the groove and spaced by the distance of the pitch of the groove.

6. An apparatus according to any one of claims 1 to 5, wherein the forward movement of the article by rotation of the shaft is such that it is less than the speed of the carrier.

7. An apparatus according to claim 6 wherein the conveyor belt moves the article forward at a speed greater than the speed at which it moved on the rotating shaft, but less than the speed at which the carrier is moved by the drive means.

8. An apparatus according to claim 7, wherein the shaft conveys the article at a speed of approximately one third the speed of the carrier and the conveyor belt conveys the garment hanger at a speed which is approximately two thirds of that of the carrier.

9. An apparatus according to claim 7, wherein the conveyor belt is inclined at the same inclination as the shaft and the conveyor belt is located such that an article delivered off the end of the shaft onto the conveyor belt will not experience any substantial upwards or downwards movement.

10. An apparatus for transferring articles onto a moving carrier, said apparatus including:
    (a) a conveyor for transporting articles;
    (b) drive means for moving a carrier; and
    (c) coordinating means;
    wherein said coordinating means is capable of controlling the relative movements of the conveyor and the drive means such that a carrier being moved by the drive means and an article being transported by the conveyor can be separately moved to a contact location at which the carrier will contact the article whilst both the carrier and the article are moving and wherein the conveyor and the carrier are configured such that the article is caused to be transferred onto the carrier following the carrier's initial contact with the article; and
    wherein the conveyor includes an inclined ramp with an associated conveyor belt and the article is transferred onto the carrier at a location adjacent to the moving conveyor belt, and
    wherein the conveyor belt is located on a separate support element which is hinged to allow downward movement upon malfunction in the transfer of the article from the conveyor belt onto the carrier.

11. An apparatus for transferring articles onto a moving carrier, said apparatus including:
    (a) a conveyor for transporting articles;
    (b) drive means for moving a carrier; and (c) coordinating means;
  wherein said coordinating means is capable of controlling the relative movements of the conveyor and the drive means such that a carrier being moved by the drive means and an article being transported by the conveyor can be separately moved to a contact location at which the carrier will contact the article whilst both the carrier and the article are moving and wherein the conveyor and the carrier are configured such that the article is caused to be transferred onto the carrier following the carrier's initial contact with the article; and
  wherein the coordinating means is provided by linked encoders and hardware which is designed to measure and regulate the speed of the conveyor and the speed of the drive means and the respective positions of the carriers and the articles to ensure simultaneous delivery of an article and a carrier to the contact location for smooth transfer onto the carrier.

12. A method of operating an apparatus according to any one of claims 1, 2, 5, 7, 9 or 10 including:

1. setting the speed of the drive means, which has a chain or belt which is driven by an electric motor, by adjusting the electric current delivered to the electric motor, 2. positioning an encoder adjacent to the chain or belt to measure the speed and position of the carrier and relaying this information to a controller for setting the speed at which the shaft is to be rotated, and 3. communicating the speed at which the shaft is rotated to separate apparatus which in turn regulates the speed of a servo motor linked to the conveyor belt drive.

13. An apparatus according to claim 1, wherein the helical thread is a raised rib located on the surface of the shaft.

* * * * *